(12) United States Patent
Su et al.

(10) Patent No.: US 9,936,410 B2
(45) Date of Patent: Apr. 3, 2018

(54) METHOD AND DEVICE FOR REPORTING CHANNEL QUALITY INFORMATION

(75) Inventors: Xin Su, Beijing (CN); Qiubin Gao, Beijing (CN); Rakesh Tamrakar, Beijing (CN); Zukang Shen, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 14/002,106

(22) PCT Filed: Oct. 13, 2011

(86) PCT No.: PCT/CN2011/080761
§ 371 (c)(1),
(2), (4) Date: Aug. 28, 2013

(87) PCT Pub. No.: WO2012/059000
PCT Pub. Date: May 10, 2012

(65) Prior Publication Data
US 2014/0016496 A1   Jan. 16, 2014

(30) Foreign Application Priority Data
Nov. 5, 2010   (CN) .......................... 2010 1 0537846

(51) Int. Cl.
H04W 24/10   (2009.01)
H04B 7/06   (2006.01)
(Continued)

(52) U.S. Cl.
CPC .......... *H04W 24/10* (2013.01); *H04B 7/0626* (2013.01); *H04B 7/0632* (2013.01); *H04L 1/0026* (2013.01); *H04L 1/20* (2013.01)

(58) Field of Classification Search
CPC ............................ H04B 7/0626; H04B 7/0632
See application file for complete search history.

(56) References Cited

U.S. PATENT DOCUMENTS

2009/0262854 A1* 10/2009 Lee, II ................. H04B 7/0417
                                                         375/267
2011/0141987 A1*  6/2011 Nam ..................... H04L 1/0003
                                                         370/329
2012/0188976 A1*  7/2012 Kim ...................... H04L 1/0025
                                                         370/329

FOREIGN PATENT DOCUMENTS

CN         101753186        6/2010
CN         101753187        6/2010
(Continued)

OTHER PUBLICATIONS

International Search Report dated Dec. 1, 2011 for PCT/CN2011/080761, dated Dec. 1, 2011.
(Continued)

*Primary Examiner* — Lakeram Jangbahadur
(74) *Attorney, Agent, or Firm* — Oliff PLC

(57) ABSTRACT

A method and a device for reporting channel quality information are provided by the present invention, the method comprising that: measuring, by a user equipment (UE), Channel State Information-Reference Signal (CSI-RS) according to the configuration information of the CSI-RS, to acquire a downlink channel transport matrix (101); determining, by the UE, Channel Quality Indicator (CQI) of a frequency domain reporting unit according to the number of CSI-RS ports and the corresponding transmission scheme of the Physical Downlink Shared Channel (PDSCH) used when determining the CQI, and the downlink channel transport matrix acquired by measurement (102); reporting, by the UE, the determined CQI to network side (103). The present invention can realize measurement and reporting of
(Continued)

CSI-RS-based channel quality information on the basis of non-Precoding Matrix Indicator (PMI) feedback transmissions.

12 Claims, 1 Drawing Sheet

(51) Int. Cl.
    *H04L 1/00*         (2006.01)
    *H04L 1/20*         (2006.01)

(56) References Cited

FOREIGN PATENT DOCUMENTS

| | | |
|---|---|---|
| CN | 101777965 | 7/2010 |
| CN | 101827387 | 9/2011 |

OTHER PUBLICATIONS

International Preliminary Report on Patentability and Written Opinion of the International Searching Authority for PCT/CN2011/080761, dated Dec. 1, 2011.

* cited by examiner

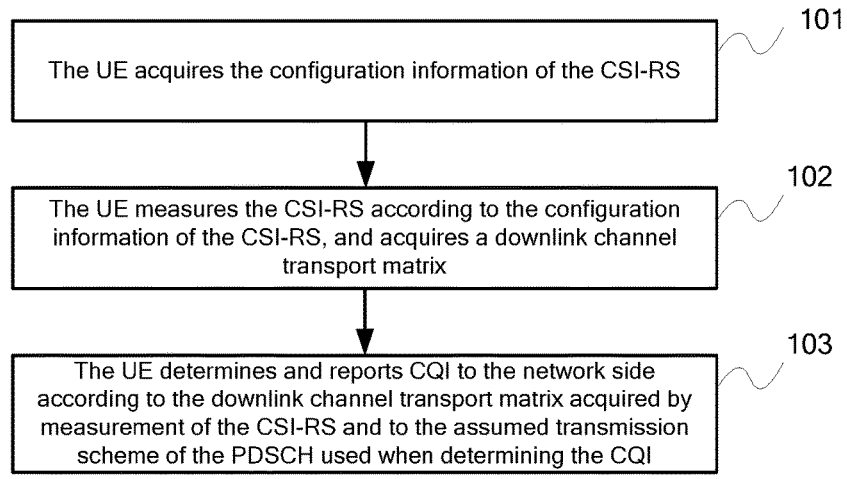
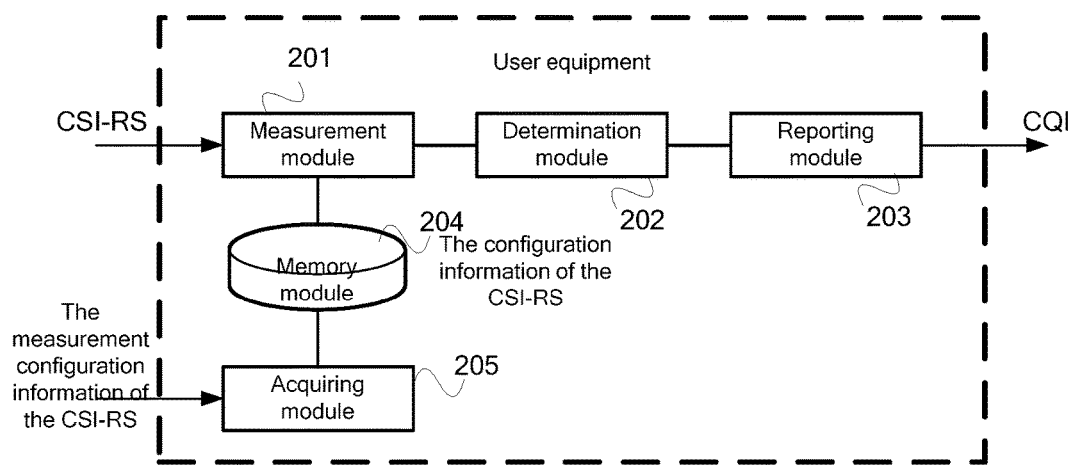
Figure 1
Figure 2

METHOD AND DEVICE FOR REPORTING CHANNEL QUALITY INFORMATION

CROSS REFERENCE TO RELATED APPLICATIONS

This application is the National Stage of PCT/CN2011/080761 filed in 13 Oct., 2011, which claims priority under 35 U.S.C. § 119 of Chinese Application No. 201010537846.0 filed on 5 Nov., 2010, the disclosure of which is incorporated by reference. The international application under PCT article 21 (2) was not published in English.

The application requires the priority to Chinese patent application, which should be submitted to the Chinese Patent Office on Nov. 5, 2010, the application No. 201010537846.0, invention name as "Method and Device for Reporting Channel Quality Information".

FIELD OF THE PRESENT INVENTION

The present invention relates to wireless communication field, in particular to a method and device for reporting channel quality information.

BACKGROUND OF THE PRESENT INVENTION

The LTE (Long Term Evolution) system adopts the physical layer frame on the basis of OFDM (Orthogonal Frequency Division Multiplexing) and MIMO (Multiple-Input Multiple-Out-put) technologies. In order to adapt to transmission environment better, the LTE system adopts various kinds of adaptive technologies. Based on different application scenes, 8 kinds of downlink transmission modes are defined in the LTE Rel-8/9 system, while another new kind of transmission mode needs to be defined in the Rel-10 system to support top 8 layers' downlink MIMO transmission. Based on the adapting foundation of transmission mode, the eNB (evolved Node B) in TM (Transmission Mode) 4, 7, 8 and 9 is able to select downlink transmission rank adaptively according to spatial characteristics of channels. Theoretically speaking, the network side is able to adjust data rate of each data layer through controlling modulation order and code rate, so as to match transmission capability of each spatial data channel precisely. However, considering control complexity and feedback overhead, the MIMO transmission of LTE system can support dynamic adjustment of at most 2-codeword MCS (Modulation & Coding Scheme). Within the transmission bandwidth of the LTE system, channel response often shows obvious frequency selectivity, thus the eNB can select UE (User Equipment) and schedule flexibly according to the channel state and interference condition at each frequency band of each UE, so as to acquire frequency selective scheduling and multi-user diversity gain. In the mean time, the network side can allocate resources reasonably according to channel state at each frequency band to avoid interference among cells. Channel quality information is the important foundation of all kinds of adaptive adjustments and scheduling performed by the network side. The LTE system quantizes channel quality into 4-bit CQI (Channel Quality Indicator), label of each CQI corresponds to an assembly of modulation mode and code rate, under which the UE should guarantee the error probability of receiving transmission block to be within 0.1.

When calculating CQI, the UE needs to assume the transmission scheme of the PDSCH (Physical Downlink Shared Channel) according to its transmission mode. For example, when calculating the CQI defined in the LTE Rel-9 system, assumption mode of the PDSCH transmission scheme is shown in Table 1.

TABLE 1

Assumption of PDSCH Transmission Scheme When Calculating the CQI

| Transmission mode | Transmission scheme of PDSCH | Description |
|---|---|---|
| 1 | Single-antenna port, port 0 | Single-antenna port, port 0 |
| 2 | Transmit diversity | Transmit diversity |
| 3 | Transmit diversity if the associated rank indicator is 1, otherwise large delay CDD | Transmit diversity if the associated rank indicator is 1, otherwise large delay CDD (Cyclic Delay Diversity) |
| 4 | Closed-loop spatial multiplexing | Closed-loop spatial multiplexing |
| 5 | Multi-user MIMO | Multi-user MIMO |
| 6 | Closed-loop spatial multiplexing with a single transmission layer | Closed-loop spatial multiplexing with a single transmission layer |
| 7 | If the number of PBCH antenna ports is one, Single-antenna port, port 0; otherwise Transmit diversity | If the number of PBCH antenna ports is 1, single-antenna port, port 0; otherwise transmit diversity |
| 8 | If the UE is configured without PMI/RI reporting: if the number of PBCH antenna ports is one, single-antenna port, port 0; otherwise transmit diversity If the UE is configured with PMI/RI reporting: closed-loop spatial multiplexing | If the UE is configured without PMI/RI reporting: if the number of PBCH antenna ports is 1, single-antenna port, port 0; otherwise transmit diversity If the UE is configured with PMI/RI reporting: closed-loop spatial multiplexing |

The CRS (Cell-specific Reference Signal)-based measurement and demodulation mode are adopted in the transmission modes 1~6 of the LTE Rel-8/9 system, while the CRS-based measurement and the DMRS (Demodulation Reference Signal)-based demodulation mechanism are adopted in TM 7 and TM 8; wherein, in TM 2~6, the UE needs to calculate and report the recommended PMI (Precoding Matrix Indicator) according to measurement of the CRS; when reporting CQI, the UE assumes that the eNB uses the reported PMI. Non-codebook precoding mode is adopted in TM 7, the UE only needs to report the CQI to the eNB, then the eNB will calculate precoding or figurative vector. Both the PMI and non-PMI feedback modes are supported in the TM 9 system. Based on feedback mode of high-layer configuration and specific reporting mode, the UE can generate reporting content (including PMI/RI (Rank Indication)/CQI) according to the measurement of CRS. In the LTE-A (LTE Advanced) system, in order to support higher-order MIMO transmission (maximum supporting 8 data layers) and multi-cell combined treatment function in subsequent versions, a newly defined CSI-RS (Channel State Information-Reference Signal) is introduced. The UE working in TM 9 cannot generate CQI/PMI/RI reporting information without the measurement of CSI-RS. In the procedure of realizing the present invention, at least the following problems exist in the current technologies:

In TM 9, for the transmission mode based PMI feedback, the UE can assume that the eNB uses the reported PMI/RI. On this basis, the UE can calculate the CQI of each codeword as per mode similar to closed-loop spatial multiplexing (such as TM 4 system). However, with regard to non-PMI feedback-based transmission mode, no CSI-RS based measurement or reporting method for channel quality information exists currently.

SUMMARY OF THE PRESENT INVENTION

The embodiments of the present invention aim to provide a method and device for reporting channel quality information, so as to realize CSI-RS-based measuring and reporting for channel quality information on the basis of non-PMI feedback transmissions, for this purpose, the embodiments of the present invention adopt the following technical scheme:

A method for reporting channel quality information, which comprises:

measuring, by a User Equipment (UE), Channel State Information-Reference Signal (CSI-RS) according to configuration information of the CSI-RS, to acquire a downlink channel transport matrix;

determining, by the UE, Channel Quality Indicator (CQI) of a frequency domain reporting unit, according to number of CSI-RS ports and the corresponding transmission scheme of Physical Downlink Shared Channel (PDSCH) used when determining the CQI, and the downlink channel transport matrix acquired by measurement;

reporting, by the UE, the determined CQI to network side.

A UE, which comprises:

measurement module, used to measure CSI-RS according to the configuration information of the CSI-RS and acquire a downlink channel transport matrix;

determination module, used to determine the CQI of a frequency domain reporting unit according to the number of CSI-RS ports and the corresponding transmission scheme of the PDSCH used when determining the CQI, and the downlink channel transport matrix acquired by measurement module;

reporting module, used to report the CQI determined by the determination module to the network side.

In the embodiments of the present invention mentioned above, the UE measures the CSI-RS, acquires a downlink channel transport matrix, determines and reports the CQI of a frequency domain unit according to the downlink channel transport matrix as well as the transmission scheme of the PDSCH used when determining the CQI, realizes measurement and reporting of CSI-RS based channel quality information on the basis of non-PMI to feedback transmissions.

BRIEF DESCRIPTION OF THE DRAWINGS

FIG. 1 is a flow diagram of reporting channel quality information of embodiments of the present invention;

FIG. 2 is a structural diagram of UE of embodiments of the present invention.

DETAILED DESCRIPTION OF THE EMBODIMENTS OF THE PRESENT INVENTION

For the above existing problems of the current technology, the embodiments of the present invention put forward a non-PMI feedback mode-based method for reporting channel quality information.

In the following parts, detailed descriptions of embodiments of the present invention are made combined with drawings of the embodiments.

FIG. 1 is referred to as the flow diagram of reporting channel quality information of embodiments of the present invention; which comprises:

Step 101, the UE acquires the configuration information of CSI-RS.

To be specific, the UE can acquire the configuration information of the CSI-RS according to system broadcast mode, viz. the UE can monitor the broadcast information of the network side and acquire the carried configuration information of the CSI-RS. The CSI-RS configuration information includes time-frequency position of the CSI-RS, transmission cycle, the number of ports for transmission of CSI-RS, etc.

Step 102, the UE measures the CSI-RS according to the configuration information of the CSI-RS, so as to acquire a downlink channel transport matrix.

Wherein, according to the transmission cycle of the CSI-RS, the UE can measure the CSI-RS transmitted from the time-frequency position indicated by the configuration information of the CSI-RS. The UE can acquire a downlink channel transport matrix by measurement of the CSI-RS, and the channel transport matrix could be shown as follows:

$$H = \begin{bmatrix} h_{11} & \cdots & h_{1T} \\ \vdots & \ddots & \vdots \\ h_{R1} & \cdots & h_{RT} \end{bmatrix} \quad [1]$$

The UE can further measure the received interference and noise.

Step 103, the UE determines and reports CQI to the network side according to the downlink channel transport matrix acquired by measurement of the CSI-RS and to the assumed transmission scheme of the PDSCH used when determining the CQI.

Wherein, before reporting CQI, the UE has acquired the transmission scheme of the PDSCH used when calculating the CQI. To be specific, the transmission scheme of the PDSCH used when calculating the CQI could be preconfigured to the UE and base station, so that the UE and the eNB will know the transmission scheme of the PDSCH used when calculating the CQI before UE reporting CQI. Based on the reporting mode configured by the high-layer, the UE can calculate and report the CQI for each frequency domain reporting unit (such as broadband or sub-band) according to the transmission scheme of the PDSCH used when calculating the CQI.

Wherein, reporting mode configured by the high-layer includes one of the following:

PUCCH (Physical Uplink Control Channel) reporting mode 1-0;

PUCCH reporting mode 2-0;

PUSCH (Physical Uplink Shared Channel) reporting mode 2-0;

PUSCH reporting mode 3-0.

In the embodiments of the present invention, the transmission scheme of the PDSCH used when calculating the CQI comprising:

the UE assumes the PDSCH is transmitted through single-port (such as port 0), when the number of CSI-RS ports is 1;

the UE assumes the PDSCH is transmitted through CRS port by transmit diversity scheme when the number of CSI-RS ports is larger than 1.

Wherein, when the number of CSI-RS ports is larger than 1, specific condition comprising:

If the number of CSI-RS ports is 2, the UE assumes the PDSCH is transmitted through two CRS ports (such as port 0 and 1) and is transmitted by two-port transmit diversity scheme, such as SFBC (Space-Frequency Block Coding);

If the number of CSI-RS ports is 4, the UE assumes the PDSCH is transmitted through four CRS ports (such as port 0 to 3) and is transmitted by 4-port transmit diversity scheme, such as SFBC+FSTD (Frequency Switched Transmit Diversity);

If the number of CSI-RS ports is 8, the UE assumes the PDSCH is transmitted through two CRS ports (such as port 0 to 1) and is transmitted by 2-port transmit diversity scheme; or the UE assumes the PDSCH is transmitted through four CRS ports (such as port 0 to 3) by four-port transmit diversity scheme.

Furthermore, it comprising:

If the PDSCH is assumed to be transmitted through two CRS ports (such as port 0 and 1), the UE further assumes the channel matrix acquired by the measurement of CRS port 0 and 1 is HW.

Where W represents an 8×2 dimension matrix, H represents a downlink channel transport matrix acquired by UE's measurement of the CSI-RS.

If the PDSCH is assumed to be transmitted through four CRS ports (such as port 0 to 3), the UE further assumes the channel matrix acquired by measurement of CRS port 0 to 3 is HW, where W represents an 8×4 dimension matrix, H represents a downlink channel transport matrix acquired by UE's measurement of the CSI-RS.

The assumed number of CRS ports and the matrix W used when the UE is calculating the CQI are predetermined before reporting, and are known to the UE and the network side.

The matrix W could be an 8×R dimension matrix, where R is equal to 2 or 4, representing the number of CRS ports used when the UE is calculating the CQI via transmitting diversity by the PDSCH. W could be a certain predefined matrix or calculated by a fixed order or selected from a matrix set as per a certain sequence; wherein, specific definition or calculation or selection rule could be determined according to realization requirements or actual application. For example, matrix W could be generated from the following methods:

Example 1: the only one element of each column of martix W is 1, while other elements are all 0. When R is equal to 2, W could be set as $$W = \begin{bmatrix} 1 & 0 \\ 0 & 1 \\ \vdots & \vdots \\ 0 & 0 \end{bmatrix}$$

Example 2: W=P·D(i)·U, here D and U are both R×R matrixes, their values are shown in Table 2. P represents an 8×R precoding matrix selected from LTE-A8 antenna codebook by some certain order. Wherein, i=0, 1, . . . , $M_{symb}^{layer}$−1, $M_{symb}^{layer}$ represents the number of symbols in each data layer.

TABLE 2

| | D and U Matrixes | |
|---|---|---|
| R | U | D(i) |
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |

TABLE 2-continued

| | D and U Matrixes | |
|---|---|---|
| R | U | D(i) |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

Example 3: when R is equal to 2, $$W = \begin{bmatrix} W_1 & 0 \\ 0 & W_2 \end{bmatrix},$$

wherein, $W_1$ and $W_2$ are both 4×1 dimension column vectors and their elements are not all 0;

When R is equal to 4, $$W = \begin{bmatrix} W_1 & & & \\ & W_2 & & \\ & & W_3 & \\ & & & W_4 \end{bmatrix},$$

where $W_1$ to $W_4$ are all 2×1 dimension column vectors and their elements are not all 0.

It should be noted that, the UE can measure the CSI-RS and report the CQI according to the transmission cycle of the CSI-RS after acquiring the configuration information of the CSI-RS. As long as the configuration information of the CSI-RS remains unchanged, the UE can always measure to the CSI-RS according to the configuration information. When the configuration information of the CSI-RS changes, the network side could inform the updated configuration information of the CSI-RS by broadcast mode, and the UE could then measure the CSI-RS and report the CQI after receiving the updated configuration information of the CSI-RS.

The UE could also acquire the configuration information of the CSI-RS in other ways besides the broadcast mode mentioned above.

Based on the same technical design, the embodiments of the present invention provide a UE which could be applied to the flow mentioned above. As is shown in FIG. 2, the UE provided by embodiments of the present invention includes:

Measurement module 201, which is used to measure the CSI-RS according to the configuration information of the CSI-RS, and acquire a downlink channel transport matrix;

Determination module 202, which is used to determine the CQI of a frequency domain reporting unit according to the number of CSI-RS ports and the corresponding transmission scheme of the PDSCH used when determining the CQI, and to the downlink channel transport matrix acquired by measurement;

Reporting module 203, which is used to report the CQI determined by the determination module to the network side.

The UE could also include memory module 204, which is used to save the transmission scheme information of the PDSCH, the transmission scheme of the PDSCH includes:

When the number of CSI-RS ports is 1, the PDSCH is assumed to be transmitted through single-port;

When the number of CSI-RS is larger than 1, the PDSCH is assumed to be transmitted through CRS port by transmit diversity scheme.

In the UE mentioned above, for the transmission scheme information of the PDSCH in the memory module 204, when the number of CSI-RS ports is larger than 1, the PDSCH is assumed to be transmitted through CRS port by transmit diversity scheme, to be specific, includes:

If the number of CSI-RS ports is 2, the PDSCH is assumed to be transmitted through 2 CRS ports by two-port transmit diversity scheme;

If the number of CSI-RS ports is 4, the PDSCH is assumed to be transmitted through 4 CRS ports by 4-port transmit diversity scheme;

If the number of CSI-RS ports is 8, the PDSCH is assumed to be transmitted through 2 CRS ports by two-port transmit diversity scheme, or the PDSCH is assumed to be transmitted through 4 CRS ports by four-port transmit diversity scheme.

In the UE mentioned above, for the transmission scheme information of the PDSCH in memory module 204, the transmission scheme of the PDSCH also includes:

If the UE assumes that the PDSCH uses 2 CRS ports, the UE will further assume the channel matrix acquired by measurement of 2 CRS ports is HW, where H represents a downlink channel transport matrix acquired by measurement of CSI-RS, and W represents an 8×2 dimension matrix.

In the UE mentioned above, for the transmission scheme information of the PDSCH in the memory module, the transmission scheme of PDSCH also includes:

If the UE assumes that the PDSCH uses 4 CRS ports, the UE will further assume the channel matrix acquired by measurement of 4 CRS ports is HW, where H represents a downlink channel transport matrix acquired by measurement of CSI-RS, and W represents an 8×4 dimension matrix.

In the UE mentioned above, the assumed number of CRS ports and the Matrix W used when determination module 202 is determining the CQI are predetermined before reporting by the UE, and are known to the UE and the network side.

In the UE mentioned above, mode of reporting the CQI by reporting module 203 is one of the following:
PUCCH reporting mode 1-0;
PUCCH reporting mode 2-0;
PUSCH reporting mode 2-0;
PUSCH reporting mode 3-0.

The UE mentioned above could also include acquiring module 205, which is used to acquire the configuration information of the CSI-RS by broadcast mode, and to save the configuration information of the CSI-RS into memory module 204.

Through the description of the embodiments of the present invention, the UE acquires a downlink channel transport matrix by measuring the CSI-RS, determines and reports the CQI according to the downlink channel transport matrix as well as the preconfigured transmission scheme of the PDSCH used when determining the CQI, realizes measurement and reporting of CSI-RS-based channel quality information on the basis of non-PMI feedback transmissions. Wherein, the embodiments of the present invention configures different transmission schemes of the PDSCH with regard to the number of CSI-RS ports so as to improve the system adaptability and flexibility.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

Through the description of the embodiments above, the technical personnel in this field can understand clearly that the present invention can be implemented by software and necessary general hardware platform or hardware (the former is better in most cases). Based on this understanding, the technical scheme or the part making contributions to the prior art of the present invention can be embodied by a form of software products essentially which can be saved in a storage medium, including a number of instructions for making a computer device (such as personal computers, servers, or network equipments, etc.) implement the methods described in the embodiments of the present invention.

The descriptions above are only preferred embodiments, it should be pointed out, that for general technical personnel in this field, on the premise of not to breaking away from principles of the present invention, some improvements and decorating can be done, which should be as the protection scope of the present invention.

The invention claimed is:

1. A method for reporting channel quality information, the method using non-Precoding Matrix Indicator (non-PMI) feedback for a transmission mode, the method comprising:
measuring, by a User Equipment (UE), a Channel State Information-Reference Signal (CSI-RS) according to configuration information of the CSI-RS, to acquire a downlink channel transport matrix;
determining, by the UE, a Channel Quality Indicator (CQI) of a frequency domain reporting unit, according to a number of CSI-RS ports and the corresponding transmission scheme of a Physical Downlink Shared Channel (PDSCH) used when determining the CQI, and the downlink channel transport matrix being acquired by a measurement; and
reporting, by the UE, the determined CQI to a network side,
wherein the transmission scheme of the PDSCH comprises: the PDSCH is assumed to be transmitted through a single-port when the number of CSI-RS ports is 1,
wherein the PDSCH being assumed to be transmitted through a Cell-specific Reference Signal (CRS) port by a transmit diversity scheme when the number of CSI-RS ports is larger than 1 comprises:
the PDSCH is assumed to be transmitted through the CRS port by the transmit diversity scheme when the number of CSI-RS ports is larger than 1;
the PDSCH is assumed to be transmitted through 2 CRS ports by a two-port transmit diversity scheme, if the number of CSI-RS ports is 2;
the PDSCH is assumed to be transmitted through 4 CRS ports by a 4-port transmit diversity scheme, if the number of CSI-RS ports is 4;
the PDSCH is assumed to be transmitted through 2 CRS ports by a two-port transmit diversity scheme, or the PDSCH is assumed to be transmitted through 4 CRS ports by a four-port transmit diversity scheme, if the number of CSI-RS ports is 8; and
further assuming, by the UE, the channel matrix acquired by measurement of 2 CRS ports is HW, if the UE assumes that the PDSCH uses 2 CRS ports, where H represents the downlink channel transport matrix acquired by measurement of CSI-RS, and W represents an 8×2 dimension matrix.

2. The method of claim 1, wherein the transmission scheme of the PDSCH also comprises: further assuming, by the UE, the channel matrix acquired by measurement of 4 CRS ports is HW, if the UE assumes that the PDSCH uses 4 CRS ports, where H represents the downlink channel transport matrix acquired by measurement of CSI-RS, and W represents an 8×4 dimension matrix.

3. The method of claim 2 wherein, the number of CRS ports and matrix W used when determining the CQI are predetermined before reporting by the UE, and are known to the UE and the network side.

4. The method of claim 1, wherein the mode for reporting the CQI by the UE is one of the following:
Physical Uplink Control Channel PUCCH reporting mode 1-0;
PUCCH reporting mode 2-0; and
Physical Shared Control Channel PUSCH reporting mode 2-0; PUSCH reporting mode 3-0.

5. The method of claim 1, wherein the UE acquires the configuration information of the CSI-RS by broadcast mode.

6. The method of claim 1, wherein the assumed number of CRS ports and matrix W used when determining the CQI are predetermined before reporting by the UE, and are known to the UE and the network side.

7. A User Equipment (UE) using non-Precoding Matrix Indicator (non-PMI) for a transmission mode, the UE comprising:
a processor configured as:
a measurement module, the measurement module being configured to measure CSI-RS according to the configuration information of the CSI-RS and acquire a downlink channel transport matrix;
a determination module, the determination module being configured to determine the CQI of a frequency domain reporting unit according to the number of CSI-RS ports and the corresponding transmission scheme of the PDSCH used when determining the CQI, and the downlink channel transport matrix acquired by measurement module; and
a reporting module, the reporting module being configured to report the CQI determined by the determination module to the network side; and
a memory device, the memory device being configured to save the transmission scheme of the PDSCH,
wherein the transmission scheme of the PDSCH includes:
the PDSCH is assumed to be transmitted through a single-port when the number of CSI-RS ports is 1,
wherein the PDSCH is assumed to be transmitted through a CRS port by a transmit diversity scheme when the number of CSI-RS ports is larger than 1,
wherein, for the information of the transmission scheme of the PDSCH saved by the memory device, the PDSCH is assumed to be transmitted through the CRS port by the transmit diversity scheme when the number of CSI-RS ports is larger than 1, which specifically includes:
the PDSCH is assumed to be transmitted through 2 CRS ports by a two-port transmit diversity scheme, if the number of CSI-RS ports is 2;
the PDSCH is assumed to be transmitted through 4 CRS ports by a 4-port transmit diversity scheme, if the number of CSI-RS ports is 4 ; and
the PDSCH is assumed to be transmitted through 2 CRS ports by a two-port transmit diversity scheme, or the PDSCH is assumed to be transmitted through 4 CRS ports by a four-port transmit diversity scheme, if the number of CSI-RS ports is 8,
wherein, for the transmission scheme information of the PDSCH saved by the memory device, the transmission scheme of the PDSCH also includes:
further assuming, by the UE, the channel matrix acquired by measurement of 2 CRS ports is HW, if the UE assumes that the PDSCH uses 2 CRS ports, where H represents a downlink channel transport matrix acquired by measurement of CSI-RS, and W represents an 8×2 dimension matrix.

8. The UE of claim 7, wherein, for the transmission scheme information of the PDSCH saved by the memory module, the transmission scheme of the PDSCH also includes: further assuming, by the UE, the channel matrix acquired by measurement of 4 CRS ports is HW, if the UE assumes that PDSCH uses 4 CRS ports, where H represents a downlink channel transport matrix acquired by measurement of CSI-RS, and W represents an 8×4 dimension matrix.

9. The UE of claim 8, wherein the assumed number of CRS ports and matrix W used when the determination module is determining the CQI are predetermined before reporting by the UE, and are known to the UE and the network side.

10. The UE of claim 7, wherein, the mode of reporting the CQI by the reporting module is one of the following:
PUCCH reporting mode 1-0;
PUCCH reporting mode 2-0;
PUSCH reporting mode 2-0; and
PUSCH reporting mode 3-0.

11. The UE of claim 7, wherein the processor is further configured as: an acquiring module configured to acquire the configuration information of the CSI-RS by broadcast mode.

12. The UE of claim 7, wherein the assumed number of CRS ports and matrix W used when the determination module is determining the CQI are predetermined before reporting by the UE, and are known to the UE and the network side.

* * * * *